US012222901B2

(12) United States Patent
Stokely et al.

(10) Patent No.: US 12,222,901 B2
(45) Date of Patent: Feb. 11, 2025

(54) PROGRAMMATICALLY CHOOSING PREFERRED STORAGE PARAMETERS FOR FILES IN LARGE-SCALE DISTRIBUTED STORAGE SYSTEMS

(71) Applicant: Google LLC, Mountain View, CA (US)

(72) Inventors: Murray M. Stokely, Mountain View, CA (US); Arif Merchant, Mountain View, CA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 17/445,339

(22) Filed: Aug. 18, 2021

(65) Prior Publication Data

US 2021/0382852 A1   Dec. 9, 2021

Related U.S. Application Data

(63) Continuation of application No. 16/434,376, filed on Jun. 7, 2019, now Pat. No. 11,113,242, which is a
(Continued)

(51) Int. Cl.
   *G06F 16/17*   (2019.01)
   *G06F 3/06*    (2006.01)
   *G06F 16/182*  (2019.01)

(52) U.S. Cl.
   CPC ........ *G06F 16/1727* (2019.01); *G06F 3/0617* (2013.01); *G06F 3/0643* (2013.01);
   (Continued)

(58) Field of Classification Search
   CPC .. G06F 16/1727; G06F 3/0617; G06F 3/0643; G06F 3/067; G06F 16/182; G06F 16/184
   (Continued)

(56) References Cited

U.S. PATENT DOCUMENTS 7,188,212 B2   3/2007  Hajji
8,140,860 B2   3/2012  Haswell
(Continued)

FOREIGN PATENT DOCUMENTS

EP   2073120 A1   6/2009

OTHER PUBLICATIONS

Janus Optimal Flash Provisioning for Cloud Storage Workloads, Albrecht et al. Jun. 24, 2013.
(Continued)

*Primary Examiner* — Sheree N Brown
(74) *Attorney, Agent, or Firm* — Honigman LLP; Brett A. Krueger (57) ABSTRACT

A method includes receiving trace data representing access information about files stored in a large-scale distributed storage system, identifying file access patterns based on the trace data, receiving metadata information associated with the files stored in the large-scale distributed storage system, and generating a preferred storage parameter for each file based on the received metadata information and the identified file access patterns. The method also includes receiving, file reliability or accessibility information of a new file, determining whether the received file reliability or accessibility information of the new file matches information of a file group of the files in the large-scale distributed storage system, and when the file reliability or accessibility information of the new file matches the information of the file group, storing the new file in the large-scale distributed storage system using the preferred storage parameter associated with the file group.

20 Claims, 8 Drawing Sheets

Related U.S. Application Data continuation of application No. 15/271,739, filed on Sep. 21, 2016, now Pat. No. 10,339,108, which is a continuation of application No. 14/033,255, filed on Sep. 20, 2013, now Pat. No. 9,477,679.

(52) U.S. Cl.
CPC ............ G06F 3/067 (2013.01); G06F 16/182 (2019.01); G06F 16/184 (2019.01)

(58) Field of Classification Search
USPC .......................................................... 707/827
See application file for complete search history.

(56) References Cited

U.S. PATENT DOCUMENTS

| | | | |
|---|---|---|---|
| 8,612,718 B2 * | 12/2013 | Li | G06F 3/0673 711/201 |
| 9,477,679 B2 | 10/2016 | Stokely et al. | |
| 2002/0091722 A1 | 7/2002 | Gupta et al. | |
| 2003/0046270 A1 | 3/2003 | Leung et al. | |
| 2003/0061362 A1 | 3/2003 | Qiu et al. | |
| 2004/0111441 A1 | 6/2004 | Saito et al. | |
| 2005/0071436 A1 | 3/2005 | Hsu et al. | |
| 2007/0043787 A1 * | 2/2007 | Cannon | G06F 16/1873 707/999.203 |
| 2009/0157991 A1 | 6/2009 | Rajan et al. | |
| 2012/0266011 A1 | 10/2012 | Storer et al. | |
| 2014/0006357 A1 * | 1/2014 | Davis | G06F 16/182 707/667 |
| 2014/0136571 A1 * | 5/2014 | Bonvin | G06F 16/2219 707/792 |

OTHER PUBLICATIONS

International Search Report mailed Jan. 29, 2015 for International Application No. PCT/US2014/056799.
McCue D. L. et al., "Computing Replica Placement in Distributed Systems", IEEE Computer Society, Nov. 12, 1992, pp. 58-61.
Written Opinion of the International Search Authority mailed Jan. 29, 2015 for International Application No. PCT/US2014/056799.

* cited by examiner

PROGRAMMATICALLY CHOOSING PREFERRED STORAGE PARAMETERS FOR FILES IN LARGE-SCALE DISTRIBUTED STORAGE SYSTEMS

CROSS REFERENCE TO RELATED APPLICATIONS

This U.S. patent application is a continuation of, and claims priority under 35 U.S.C. § 120 from, U.S. patent application Ser. No. 16/926,391, filed on Jul. 10, 2020, which is a continuation of U.S. patent application Ser. No. 16/702,535, filed on Dec. 3, 2019, which is a continuation of U.S. patent application Ser. No. 16/434,376, filed on Jun. 7, 2019, which is a continuation of U.S. patent application Ser. No. 15/271,739, filed on Sep. 21, 2016, which is a continuation of U.S. patent application Ser. No. 14/033,255, filed on Sep. 20, 2013. The disclosures of these prior applications are considered part of the disclosure of this application and are hereby incorporated by reference in their entireties.

TECHNICAL FIELD

This disclosure relates to programmatically choosing preferred storage parameters for files in large-scale distributed storage systems.

BACKGROUND

Figure 1:
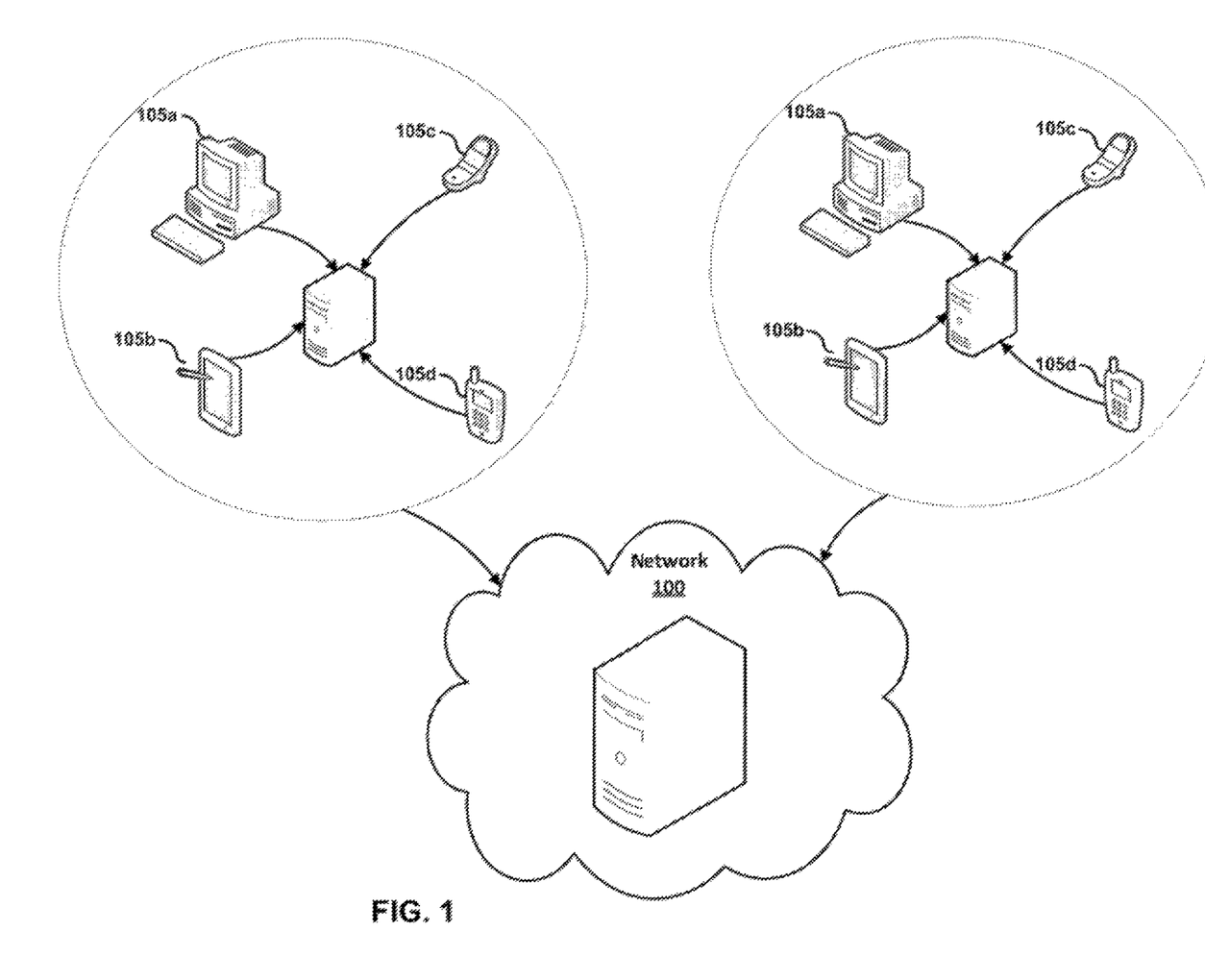
FIG. 1 is a block diagram illustrating an example configuration of a large-scale distributed storage system.

As shown in FIG. 1, large-scale distributed storage systems provide networked online storage and allow multiple computing devices to store, access, and share files in the online storage. Distributed storage systems may use client/server architecture in which one or more central servers store files and provide file access to network clients.

Storage devices may include servers in a datacenter with flash, disk drives, and/or RAM memory and may provide varying levels of access to files. For example, some storage devices may provide files faster or may be more available than others.

Figure 2A:
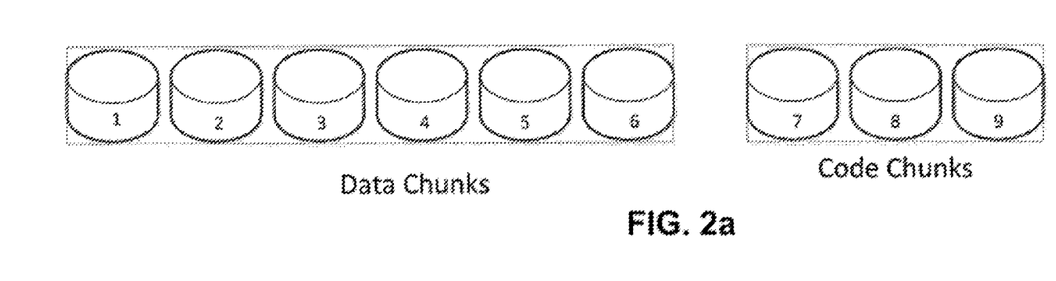
FIG. 2a is a block diagram illustrating an example of chunking files.
Figure 2B:
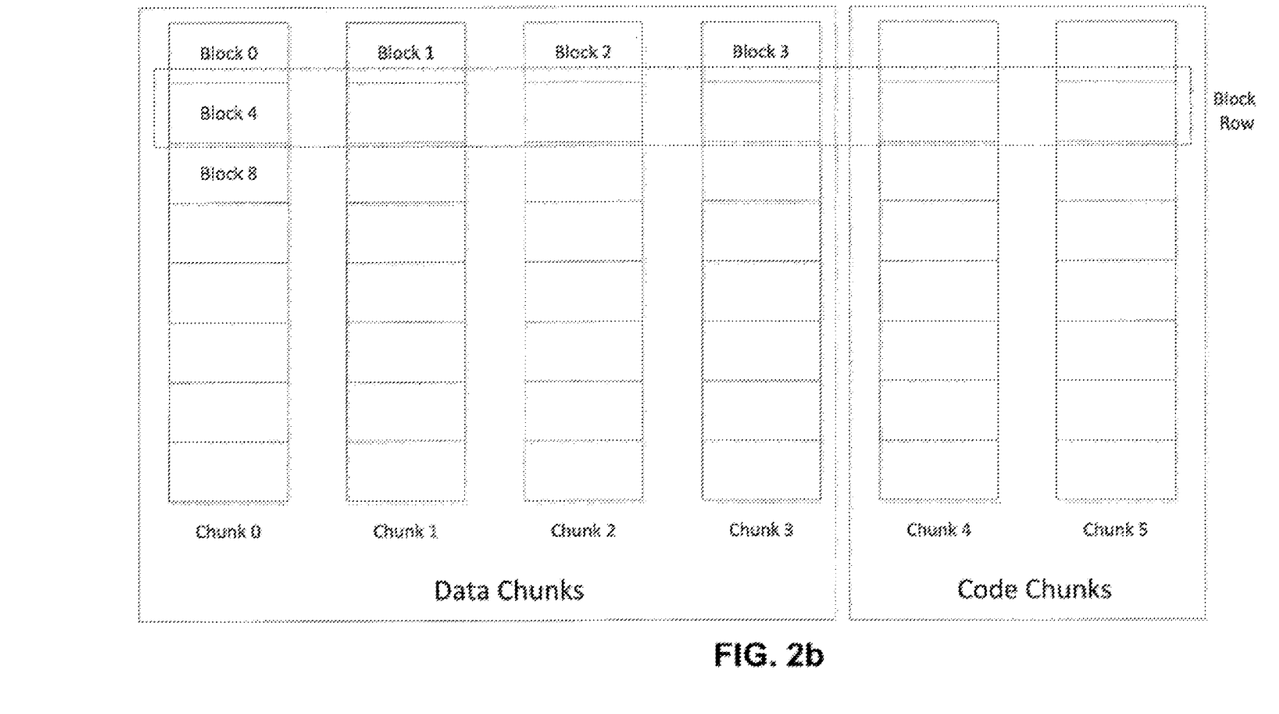
FIG. 2b is a block diagram illustrating an example of chunking files.

Data files stored in large-scale distributed storage systems can be very large, potentially multi-gigabytes in size. In order to manage these files, files are commonly split into fixed-sized chunks, as illustrated in FIGS. 2a and 2b. Multiple data chunks may make up one data file. Code chunks are additional chunks computed from the data chunks using a mathematical formula. Normally, if the user reads data stored in a large-scale distributed storage system, the data is read from the data chunks, also called systematic chunks. However, if some data chunks are unavailable, the storage system may read the code chunks to recover the missing data chunks by a mathematical computation over the available data chunks and code chunks. The number of failed or unavailable data chunks that can be recovered depends on the number of code chunks available and the encoding system used. Although FIG. 2b depicts a file that is striped across chunks one byte or character at a time, usually a chunk is a contiguous portion of a file. For example, a contiguous portion may be the first 1 MB. Using a 4+2 encoding similar to that shown in FIG. 2b, a stipe might have 4 MB of file data with the data spread across chunks 0-3 with each chunk containing a megabyte of data. Two code chunks may be constructed by a mathematical operation on chunks 0-3. If the file is larger than 4 MB, a second stripe may be created which may also be up to 4 MB with two code chunks.

When storing files in large-scale distributed storage systems, chunks may be striped across multiple storage devices. Data striping is a technique of segmenting logically sequential files so that consecutive segments are stored on different physical storage devices. A stripe is one segment of a file written to one storage device. The size of each stripe, or chunk, may be configurable in order to allow each storage device to provide a maximum amount of data in the shortest amount of time. Stripe width is the number of parallel stripes that can be written to or read from concurrently. Striping is useful when a client device requests access to a file more quickly than a single storage device can provide the file. By striping file across multiple storage devices, a client device may be able to access multiple file segments simultaneously.

In addition to being chunked and striped across multiple storage devices, files in a large-scale distributed storage system may be encoded to correct errors that occur during file transmission or storage. For example, Reed-Solomon encoding may add extra "redundant" bits to files that can be used to recover the original file in the event that bits are lost during file transmission or storage.

Once a file is stored, clients can request the file from the large-scale distributed storage system. When a client requests to access a data file or part of a data file, a large-scale distributed storage system server may respond with the location of the appropriate file. In some large-scale systems, the client may acquire a lease on the file and hold the lease until the client releases the file. Although multiple reads may proceed simultaneously during the lease time, no other clients may be able to write. Furthermore, if many clients want to access to the same file at the same time, it may be desirable to replicate data in order to provide sufficient performance for more than one client to access a particular file chunk at a given time. Additionally or alternatively, files may be replicated across multiple storage devices in order to allow the file chunks to be available even if a storage device fails or becomes unavailable. The replication level of a particular chunk is the number of storage devices on which duplicate file data is stored. For example, a three-way replicated stripe would involve putting three chunks that are exact copies of each other on three different storage devices. It may be costly to store files in multiple systems across multiple datacenters. However, storing files in a single system or datacenter may cause problems if there is a system or datacenter outage and the file is unavailable.

SUMMARY

This specification describes technologies relating to cloud storage in general, and specifically to methods and systems for programmatically choosing preferred configuration parameters for storing and provisioning files in large-scale distributed storage systems.

In general, one aspect of the subject matter described in this specification can be embodied in a system and method for programmatically determining preferred storage parameters for files stored in a large-scale distributed storage system. An exemplary system may include one or more processing devices and one or more storage devices that store instructions to execute steps of an exemplary method.

An exemplary method may include: receiving a desired file reliability or availability requirement; receiving system characteristics which include statistics of system outages in a datacenter; predicting future failures of the storage system based on system outage statistics; receiving file encoding or replication information for at least one file in the storage system; predicting file reliability and maintenance costs based on past system failures and file encoding and replication information; and determining preferred storage parameters for at least one file to minimize cost while achieving the desired file reliability or availability based on the received requirement.

A second exemplary method may include: receiving a desired file reliability or availability requirement; receiving system characteristics which include information regarding the storage system, off-site backups for the storage system, and file access patterns for files stored in the storage system; determining historical reliability of the system, reliability of off-site backups for the storage system, and reliability of files stored using each possible file encoding or replication level in the system; predicting the future reliability of the storage system based on the determined reliability of the storage system; predicting the future reliability of files stored in the storage system for each file encoding or replication level; determining the probability of losing both the large-scale system and the off-site storage system backups using the predicted reliability of the storage system and the off-site backups; and determining a preferred storage parameter for at least one file based on the determined probability of losing both the storage system and the off-site backups, the predicted reliability of each encoding or replication level, and the received desired file reliability or availability requirement.

These and other embodiments can optionally include one or more of the following features. A storage parameter may be a stripe width, a stripe size, an encoding or replication level, a backup schedule for the large-scale distributed storage system, or a location for storing a file. A location may define placement of a file on a device in the large-scale distributed storage system or the location may define placement of a file on a backup device for the large-scale distributed storage system. File characteristics may be displayed on a dashboard. A user may be notified about a preferred storage parameter. A generated preferred storage parameter may be used to store a file with or without user consent.

In general, one aspect of the subject matter described in this specification can be embodied in a system and method for programmatically determining preferred storage parameters for files stored in a large-scale distributed storage system. An exemplary system may include one or more processing devices and one or more storage devices that store instructions to execute steps of an exemplary method. An exemplary method may include: receiving trace data which represents access information about files stored in the large-scale distributed storage system; analyzing the trace data to identify file access patterns; receiving metadata information associated with the files stored in the large-scale distributed storage system; and generating a preferred storage parameter for at least one of the files based on the received information and identified file access patterns.

These and other embodiments can optionally include one or more of the following features: at least one storage system characteristic may be received and used in addition to the received information and identified file access patterns to generate a preferred storage parameter; a system characteristic may be system outage history, maintenance outage history or schedule, system device availability, system device performance, or I/O capacity; and a file availability or reliability requirement may be received and used in addition to the received information and identified file access patterns to generate a preferred storage parameter. Analyzing the trace data to identify file access patterns may include receiving trace data for a subset of the files in the large-scale distributed storage system; determining a characteristic of the subset; and estimating the distribution of the characteristic for the files in the large-scale distributed storage system based on the determined characteristic of the subset. A characteristic for the files may be the age of each file at the time the file was last accessed. Generating a preferred storage parameter for at least one file may include defining at least one file group based on identified file access patterns; generating a preferred storage parameter for the file group characteristics; and using the generated storage parameters to store at least one file associated with the file group. Metadata information associated with a file may be received along with file reliability or accessibility information associated with the file. This information may compared to information from a defined file group in the large-scale distributed storage system. If the file information matches the information of a defined file group, the file is stored with storage parameters associated with the file group. If the file information does not match information of a defined file group, a new file group is created based on the file's information and preferred storage parameters may be generated for the new file group based on the file group's characteristics. User consent may be needed before implementing a file group policy for assigning storage parameters to files based on the generated preferred storage parameters for the new file group. Storage parameters may include: stripe width, stripe size, encoding or replication level, a backup schedule, or a location. A location may define placement of a file on a device in the large-scale distributed storage system or the location may define placement of a file on a backup device for the large-scale distributed storage system. File group characteristics may be displayed on a dashboard and a user may be notified about preferred storage parameters. A generated preferred storage parameter may be automatically used to store a file or may be used to store a file after user consent. A user may be notified that applying the preferred storage parameter improves the cost of storing a file. Preferred storage parameters may be generated for a plurality of files and users may be notified about the preferred storage parameters for a subset of the plurality of files where applying the preferred storage parameters would improve the files' availability, reliability, or storage cost.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Replication, encoding level, stripe width, stripe length, storage system backup schedule, and file location are all configurable storage parameters that may affect the performance of large-scale distributed storage systems in terms of file access and retrieval. Large-scale distributed storage system should use these parameters to store files in a manner that optimizes system resources and allows files to be retrieved as efficiently and quickly as possible.

Large-scale storage system optimization may include balancing the cost of file access, overall system performance, and file accessibility and reliability. Optimization may be achieved by modifying file storage parameters including replication, encoding level, file stripe width, stripe size, storage system backup schedule, and file location based on factors such as file characteristics and storage system characteristics.

Although customary systems may allow application developers to choose file storage parameters, application developers may not understand the preferred storage parameters that should be chosen or be aware of the ways in which storage parameters interact. Aspects of the inventive concepts may automatically, or programmatically, choose or recommend preferred storage parameters for a given set of files or a workload in a distributed storage system based on file and/or storage system characteristics in order to optimize the large-scale storage system.

Specifically, when trying to optimize a large-scale storage system, the type of files that the system is storing and file access patterns are important to consider. File type may be informed by analyzing the metadata associated with files. Metadata may provide file characteristics such as file size, file name, file age, and the actual type of file.

An exemplary embodiment may use telemetry or monitoring systems to obtain telemetry data and/or system monitoring data (referred to herein as trace data). This obtained trace data may be used to identify file access patterns for files stored in large-scale distributed storage systems. Monitoring systems may provide an exemplary storage system with trace data in log files or some other format. Individual events and sequences of time-stamped events in time order, called traces, may be recorded in trace log files. Trace data may include information about file access in a large-scale storage system such as reads, writes, updates, users or applications that access a file, the frequency with which a file is accessed, the time at which a file is accessed, the sequence in which different parts of a file are accessed, the user or application that last accessed a file, and when a file was last accessed among other information.

Figure 3:
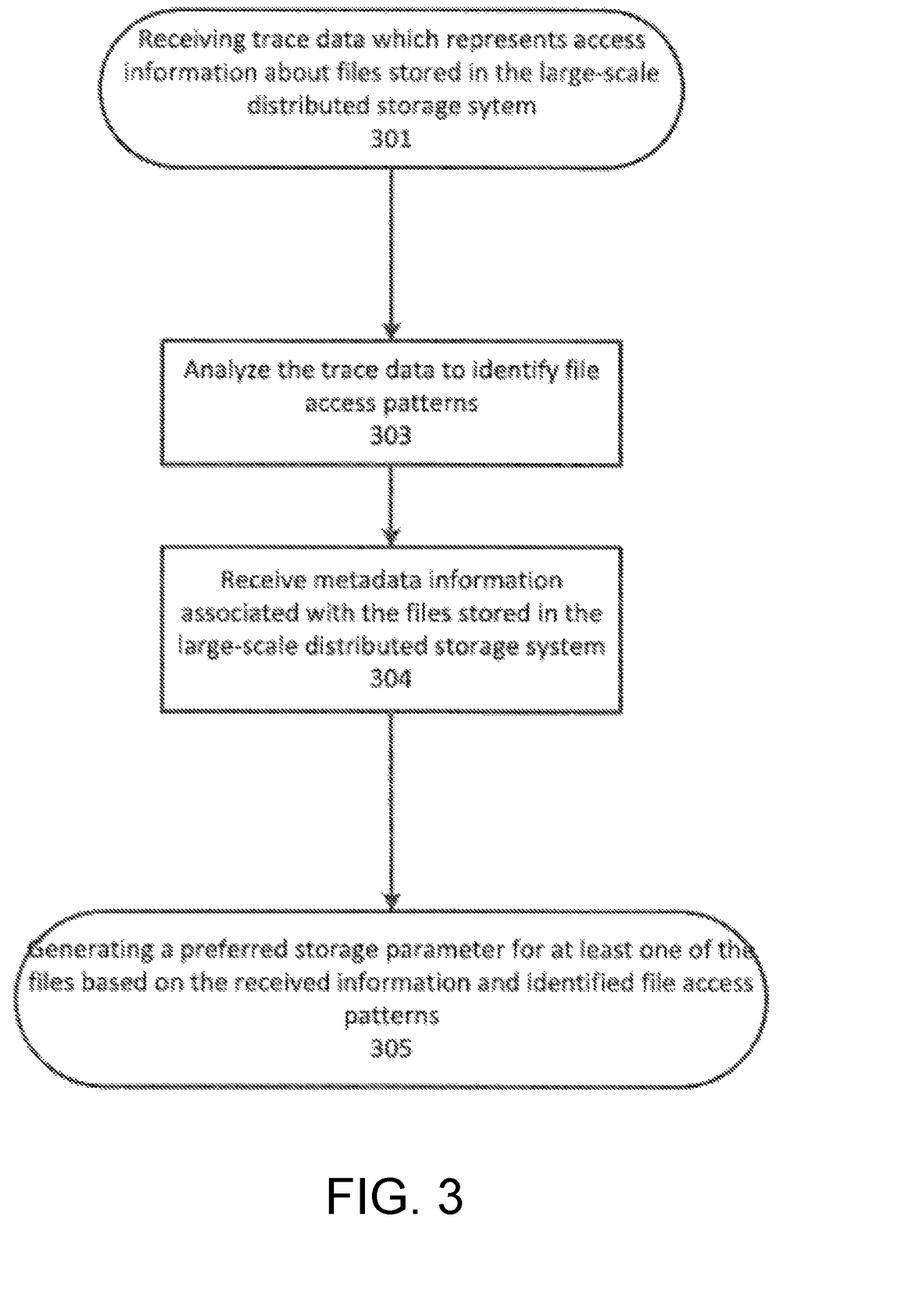
FIG. 3 is a flow diagram of an exemplary method for programmatically generating preferred storage parameters for files stored in a large-scale distributed storage system.

Trace data may be used by an exemplary storage system to establish file access patterns for individual files or for sequences of file accesses. The sequence in which files are accessed may be useful for a caching analysis which may help determine if, for example, it is preferred to store files on a server with significant RAM cache or on flash memory. An exemplary method for generating preferred storage parameters for files stored in a large-scale distributed storage system may begin by receiving trace data that represents access information about files stored in the large-scale distributed storage system as shown in FIG. 3 (301). The trace data may be analyzed to identify file access patterns (303). The system may also receive metadata information associated with the files stored in the large-scale distributed storage system (304). A preferred storage parameter may then be generated for at least one of the files based on the received information and identified file access patterns (305).

Figure 4:
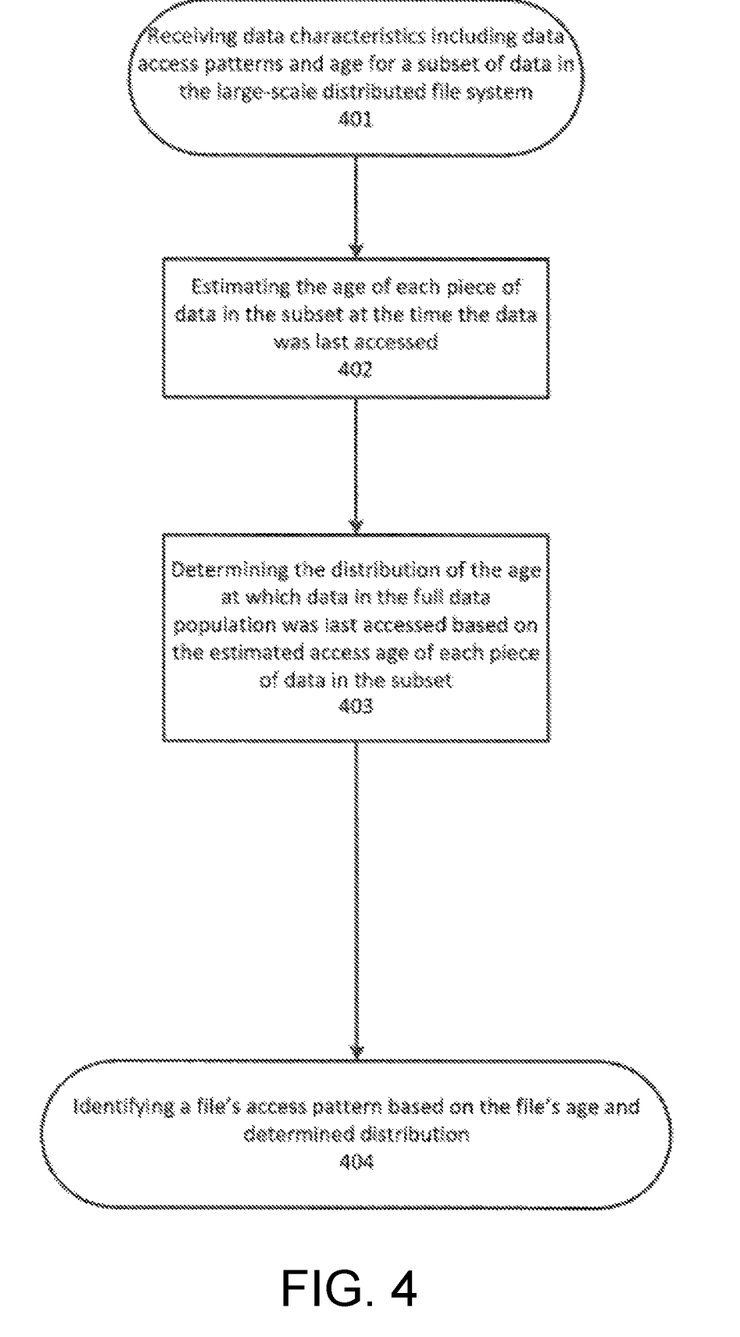
FIG. 4 is a flow diagram of an exemplary method for analyzing trace data to identify file access patterns in a large-scale distributed storage system.

In some embodiments, analyzing trace data to identify file access patterns includes receiving trace data for a subset of the files in the large-scale distributed storage system. A characteristic of the subset may then be determined. An exemplary system may then estimate the distribution of the characteristic or the characteristic itself for the files in the large-scale distributed storage system based on the determined characteristic of the subset. For example, the age of each file at the time the file was last accessed may be estimated based on a subset of a storage systems files. FIG. 4 illustrates that using access patterns from a subset of the file population (401), an exemplary method may analyze trace data to identify file access patterns to compute the estimated age of each file in the subset at the time the file was last accessed (402). The estimated access age of each file in the subset can be used to infer the distribution of the age at which a file in the full file population was last accessed (403). This distribution can be used to identify a file's access pattern based on the file's age and the determined distribution (404).

Telemetry and/or monitoring systems may also provide an exemplary system with information regarding large-scale distributed storage system characteristics. In one embodiment, an exemplary method may receive at least one storage system characteristic and use the storage system characteristic in addition to other received information and identified file access patterns to generate the preferred storage parameter. Storage system characteristics may include the availability, capacity, and performance of storage devices including servers in a large-scale distributed storage system. An exemplary embodiment may acquire statistics about device outages and the reliability of storage devices in a storage system as well as offsite backups. Offsite backups may be secondary instances of a distributed storage system that are housed in datacenters other than the datacenter in which the primary distributed storage system is located. An offsite backup may also be other cold-storage devices stored offsite. A preferred storage system may be location of the file in the large-scale distributed storage system. Location may include specifying a device in the large-scale distributed storage system on which to store a file or specifying file placement on a backup device for the large-scale distributed storage system. Alternatively, a preferred storage parameter may be a backup schedule that determines how often large-scale distributed system data is saved to back up storage and whether the backups will be full or incremental.

An exemplary embodiment may receive desired file reliability and availability requirements as an input from a user or application. An exemplary system may need to understand if the file requires very reliable access or if some probability of failure to access is acceptable. This file availability or reliability requirement may be used along with other received information and identified file access patterns to generate a preferred storage parameter.

Trace data from monitoring systems may provide information so that an exemplary system can establish name patterns and/or other group types for files from a particular application or process. Name patterns may be combined with other file characteristics such as the current user or application accessing the file, the time of day that the file was created, whether the user or application specified an encoding or replication level, the encoding or replication level if one was specified, and/or the permissions associated with the file. File characteristics and/or file access patterns may be used to find files that may be grouped together. Grouping may be done manually or by using a machine learning classification or clustering algorithm.

Two techniques for grouping files are: (1) classifying files and (2) clustering files. Classification includes grouping files based on criteria that are known such as certain metadata features. Clustering includes grouping files by similar access patterns or characteristics. A number of distinct characteristics may be used to cluster files. An example clustering technique is k-means, there are also many other machine learning classification and clustering techniques for data mining. This technique can be used to cluster files into k groups that have similar characteristics by creating heuristic functions that define the distance between files based on the characteristics. Classification techniques such as "classification trees" or "regression trees" could be used to form file groups that may be predicted to have some characteristic based on previously seen patterns. For example, groups of files may be predicted to be accessed intensively for a three-month period and then not at all based on having observed that access pattern for that file group in the past. The regression tree classifier may be given some files that have this access pattern and some files that do not. The classifier may then come up with a criterion that may be able to predict this access pattern behavior a priori.

Files may be classified into particular categories including: (1) important, frequently accessed files with high availability and low latency requirements; (2) important, infrequently accessed files with high availability requirements, but no latency requirements; (3) unimportant, frequently accessed files; and (4) unimportant infrequently accessed files. Files may be grouped using file metadata and/or file access patterns. These groups may be associated with preferred storage parameters. For example, a requirement for high file availability may map to a larger stripe width of file data which offers more redundancy in the case of storage device failures. A low latency requirement for a file may map to a higher replication level of file data instead of Reed-Solomon encoding which provides redundancy, but requires computation, which increases the latency, to reconstruct missing data in cases of storage device failures. A category for seldom accessed, unimportant files may map to encoding choices with less replication overhead in order to minimize the cost of file storage. For example, a file may be replicated across multiple data centers in different continents. The file may receive many accesses from each continent. Accessing the file from a different continent is expensive, so this replication makes sense. Once the access rates drop for the file or it can be determined that the file is unlikely to receive many accesses, the file may be moved to a Reed Solomon encoding across data centers. This encoding maintains availability even if one data center is unavailable, providing for possible higher cost per access, but lower storage cost.

Files may also be clustered into groups with similar access characteristics. Depending on the user or application accessing a particular file, there may be patterns in file usage. For example, in an electronic book-building application, there may be a series of text and image files that are eventually converted into an ebook format, such as *.epub, for distribution. After the conversion, the original files are rarely accessed. Similarly, a database running on top of a large-scale distributed storage system may store intermediate file formats with a certain recognizable name pattern. These files may only be used for a limited time period after they are created, but they may be used intensely during the time period. Clustering includes picking a feature or set of features on which to cluster, or group files. Access patterns for a particular file in the cluster may be estimated based on determined access patterns of other files in the cluster. Preferred storage parameters such as encoding or replication level and location are determined based on the estimated access patterns as well as system characteristics such as server reliability and speed.

For example, an application may create several temporary files in the course of execution that are all stored in a large-scale distributed storage system. These temporary files may be designated with a prefix of "TEMP." Using trace data from a monitoring system, an exemplary storage system may analyze the trace data and determine that these temporary files may be used during application execution, but once the application has finished executing, the temporary files are no longer needed. Trace data may inform an exemplary system that temporary files are only used for a limited time period after they are created, but that they are frequently used during that limited time period. For example, temporary files may be frequently used on the day on which they are created, but these files may never be accessed after this day. However, the application may not delete the temporary files from the storage system.

An exemplary method may cluster these temporary files using file characteristics such as file name, creation date, last accessed time, and access patterns. Files with a file name containing a prefix of "TEMP" with a last accessed time within a day of the creation date may be associated with the cluster. The cluster may specify a location storage parameter that keeps a file associated with the cluster in fast storage on its file creation date because the file will be frequently accessed. After the creation date, the cluster may specify that the temporary file should be moved to slower storage since it is less likely to be accessed after the file's creation date.

Using another example, if, based on trace data, an exemplary system determines that an application's files are busily accessed for a week and then seldom accessed, an exemplary system may need to provide only enough fast storage for storing a week's worth of new files for the application. The exemplary system may move all the files that are over a week old to slow storage since, based on file access patterns, the system has determined that files over a week old are seldom accessed.

If an exemplary system observes that some file patterns have a temporal access pattern such that files are not accessed as much after a certain age, for example 30 days, the system may determine that the encoding of these files should match the file pattern once the file has reached the certain age. An exemplary system may observe access pattern behavior through trace data. It may also be possible to set up monitoring for specific conditions. Monitoring may count and report how many accesses a certain group of files receives if the group definition (or the file pattern) is known in advance.

If a file was created with a stripe length N, but the file has been closed and marked immutable, an exemplary system can compare the total size of the file to the specified stripe length and re-encode the data to use a stripe length of the file's total size if the file's total size is less than the specified stripe length.

In some embodiments, generating a preferred storage parameter for at least one file includes defining at least one file group based on identified file access patterns, generating a preferred storage parameter for the file group based on the file group characteristics, and using the generated storage parameter to store at least one file associated with the file group.

When subsequently storing a new file, an exemplary system may receive metadata information associated with the file and receive file reliability or accessibility information/requirement associated with the file. The system may then determine whether the received file information matches information of a defined file group in the large-scale distributed storage system. If the new file's characteristics match characteristics of a defined group, the new file may be stored with the storage parameters associated with the file group. If the file's characteristics do not match a defined file group's characteristics, a new file group based on the file's information may be created and preferred storage parameters for the new file group may be generated based on the file group's characteristics. In some embodiments, user consent may be required before implementing a file group policy for assigning storage parameters to files based on the generated preferred storage parameters for the new file group.

Figure 5:
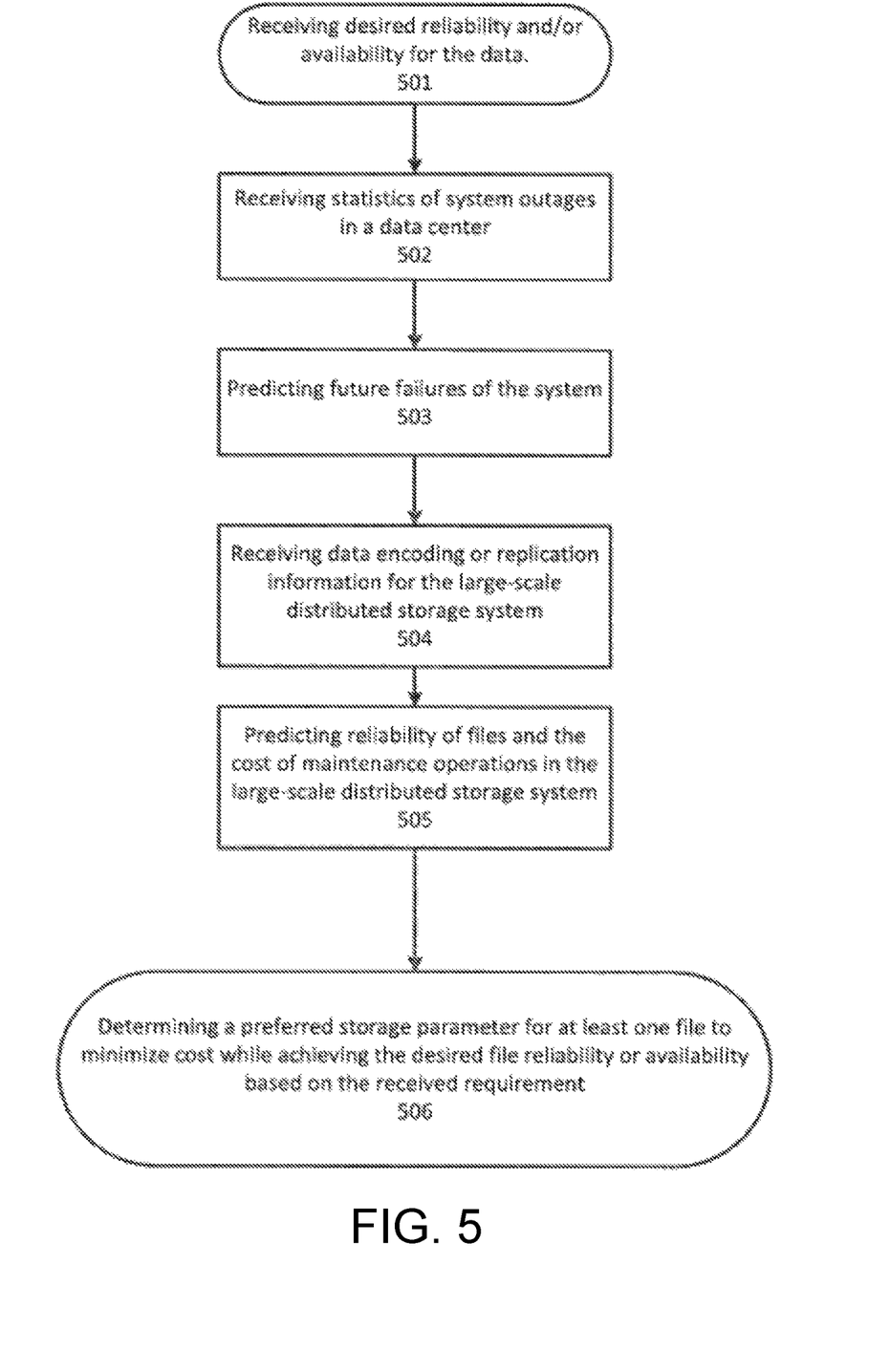
FIG. 5 is a flow diagram of an exemplary method for determining preferred storage parameters for files stored in a large-scale distributed storage system.

In some embodiments, an exemplary system may determine storage parameters such as file encodings or replications to minimize the cost of file storage, while providing adequate file reliability/availability based on received or determined file reliability/availability requirements. An exemplary method for determining preferred storage parameters for files stored in a large-scale distributed storage system begins with receiving a desired reliability and/or availability requirement for a file or set of files as illustrated in FIG. 5 (501). The method may also receive storage system characteristics which include statistics of system outages in a datacenter (502). Storage system characteristics may also include storage system availability, capacity, and performance of storage devices including servers in a large-scale distributed storage system. For example, the file encoding chosen may be constrained by the amount of space available in the storage system since the encoding determines how much storage space the file uses. This historical information may be obtained from trace data provided by a monitoring system that monitors the health of the large-scale distributed storage system. Future failures of the distributed storage system may be predicted using these statistics (503). An exemplary method may assume that individual storage devices will continue to fail in the future at a rate similar to the rate at which storage devices have failed in the past. The probability of concurrent, correlated storage device failures may also be assumed to remain constant at a rate similar to the rate observed in the past. Alternatively, a more pessimistic prediction model may be used which adds a factor to increase the expected number of failures in the future as large-scale distributed storage system equipment ages.

In other embodiments, an exemplary system may receive file encoding or replication information for files stored in the system (504). This encoding or replication information may come from received file metadata. Actual file reliability/availability and maintenance operation costs may be predicated based on past, or historical, system failures and file encoding or replication information (505). A preferred storage parameter, such as file encoding or replication, for at least one file may be determined to minimize the cost of file storage, while providing desired file reliability (506).

Figure 6:
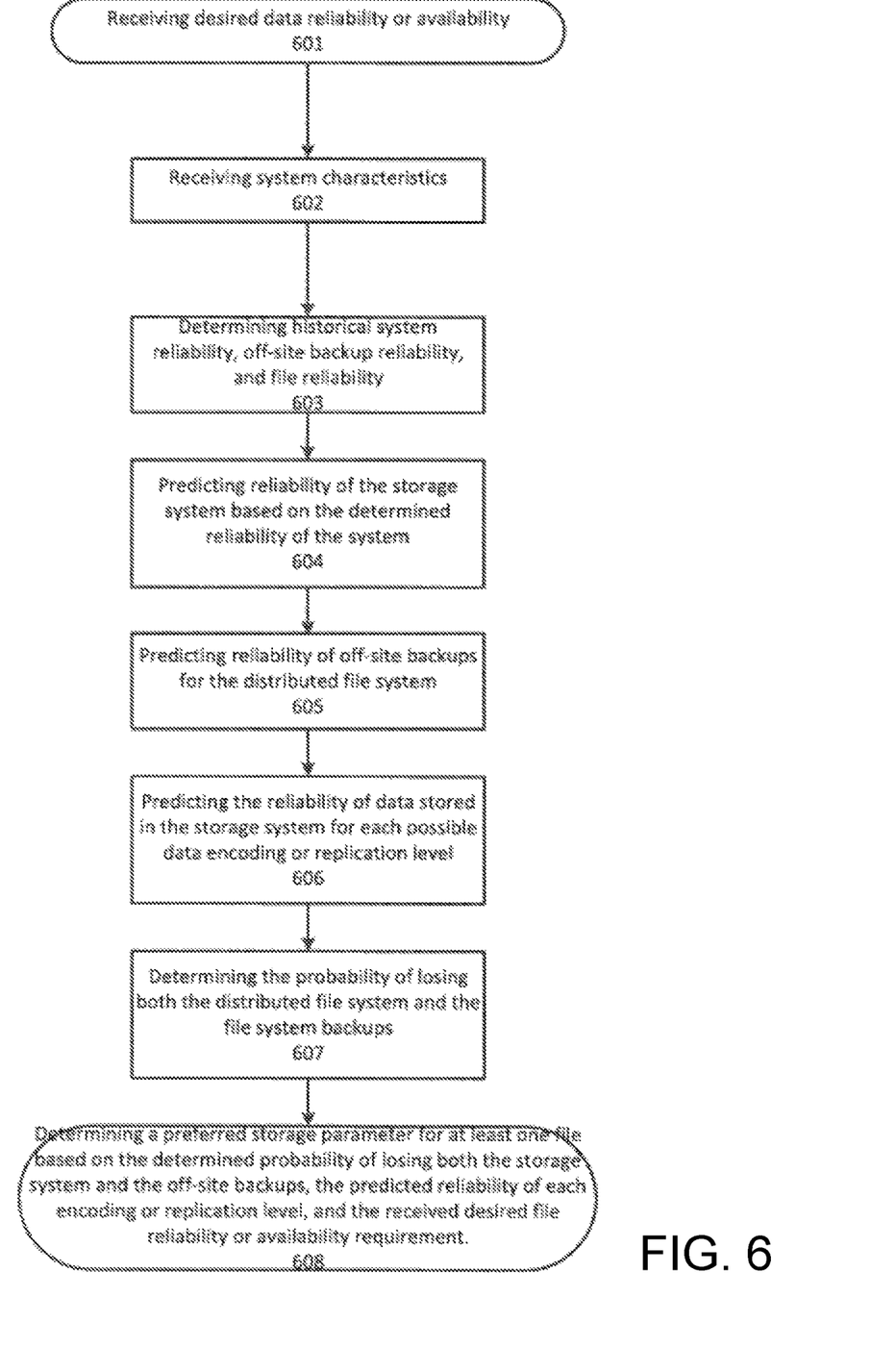
FIG. 6 is a flow diagram of an exemplary method for determining preferred storage parameters for files stored in a large-scale distributed storage system.

In order to obtain desired file reliability/availability per file, an exemplary method may use system characteristics, file characteristics, and the desired file reliability/availability to determine preferred storage parameters such as encoding or replication level. The method begins with receiving the desired file reliability or availability as shown in FIG. 6 (601). The method may then receive system characteristics (602). System characteristics may include traces and other data that assists an exemplary storage system in determining the reliability of the system in general, determining the historical reliability of off-site backups for the storage system, and determining the reliability of files stored using each possible file encoding or replication level in the distributed storage system (603). The method may predict the future reliability of the storage system based on the determined reliability of the system (604). The method may also predict the future reliability of the off-site storage system backups based on the determined reliability of the backups (605). Additionally, the method may predict the future reliability/availability of files stored in the storage system for each possible file encoding or replication level (606). The probability of losing both the large-scale distributed storage system and the storage system backups may be determined using the predicted reliability of the storage system and its backups (607). The method may then determine a preferred storage parameter, such as encoding or replication level, for at least one file based on (1) the determined probability of losing both the storage system and the off-site backups, (2) the predicted reliability of each encoding or replication level, and (3) the received desired file reliability or availability requirement (608).

Other customary methods, such as those described in "Designing Dependable Storage Solutions for Shared Application Environments", Shravan Gaonkar et al., 2006, may use abstract models of workloads, devices, and dependability techniques that can be applied (e.g. redundancy and backups) to determine good configurations for storing files in a large-scale distributed storage system. However, customary methods do not suggest the use of tracing data and/or system monitoring to determine preferred storage parameters for files stored in a large-scale distributed storage system.

Recommendations and/or automatic adjustments to storage parameters resulting from the exemplary methods may be displayed to a user via a dashboard or some other user interface or API. A user may also be able to view predicted reliability, distribution of file age access patterns, and other file and system characteristics with a dashboard, user interface, or API. Specifically, a dashboard may show a user aggregate access characteristics and patterns regarding files so that the user can understand and improve access behavior. For example, the user or the user's application may be performing large amounts of very small reads or creating many small files which may be expensive. A user may also observe that the user or an application associated with the user is storing large number of files that are old, but never accessed in a large-scale distributed storage system. These behavior and/or access patterns may be expensive and the user may be able to find ways to minimize the patterns. The user may choose to delete these files based on the information received from the dashboard.

Recommendations may also or alternatively be in the form of notifications. In addition to recommendations regarding configuration parameters, an exemplary method may advise a user to delete a file if the method determines that the file is no longer needed or not being accessed. An exemplary system may use the date of last file access in order to advise a user to investigate whether the file should be deleted. For example, if a file has not been accessed in a long period of time such as 180 days, the system may question the user regarding the necessity of continuing to store the file. If the data is read infrequently in a specific file or file pattern, for example if there has been no accesses in 90 days, an exemplary system may notify a user or application that the data should be re-encoded in a more space-efficient way. For example, for data that is replicated, an exemplary system may reduce the number of replicas. If the data is Reed-Solomon encoded, an exemplary system can determine a new encoding with less redundancy reducing the space needed for the data on disk.

Example notifications may include: (1) if a file has not been read in a year, notify the user that the file should be deleted or archived; (2) if a file has not been read in a month, but the file is stored on an expensive storage medium, such as flash memory, notify a user that the file is being stored on expensive storage medium, but is not being read; (3) if a file has not been read in a month, but is stored in a relatively expensive format, such as storing four replicas of the data, notify the user that a more space-efficient encoding for the file may be appropriate. These notifications are just example notifications and are not meant to limit the scope of this application in any way.

An exemplary system may notify a user regarding preferred storage parameters to alert a user to files that currently have poor storage configurations. By applying the preferred storage parameters, a user may significantly improve the cost of storing the tiles or improve the files' adherence to the desired availability/reliability requirements. An exemplary system may alternatively only notify a user about the preferred storage parameters for a subset of files. In general, there may be so many files with possibly better configurations that a user or exemplary system may limit corrections only to those files where the most significant improvements may be made. An exemplary system may compare the potential improvements among files if preferred storage parameters were to be applied to determine the subset of files about which to inform the user. A user may be notified about a subset of files for which applying the preferred storage parameters would significantly improve the files' availability, reliability, or storage cost.

Preferred storage parameters may be implemented automatically to correct storage configuration problems in a large-scale distributed storage system. In some embodiments, preferred storage parameters may only be used to correct storage problems after obtaining user consent. Preferred storage parameters may be used to store a file upon file creation or at a later time once the file has been stored in a large-scale distributed storage system.

Large-scale file storage and access may be handled in a distributed file processing and storage system, such as a datacenter or a network of datacenters. For example, large-scale Internet services and the massively parallel computing infrastructure that supports such services may employ warehouse-sized computing systems, made up of thousands or ten thousands of computing nodes.

Figure 7:
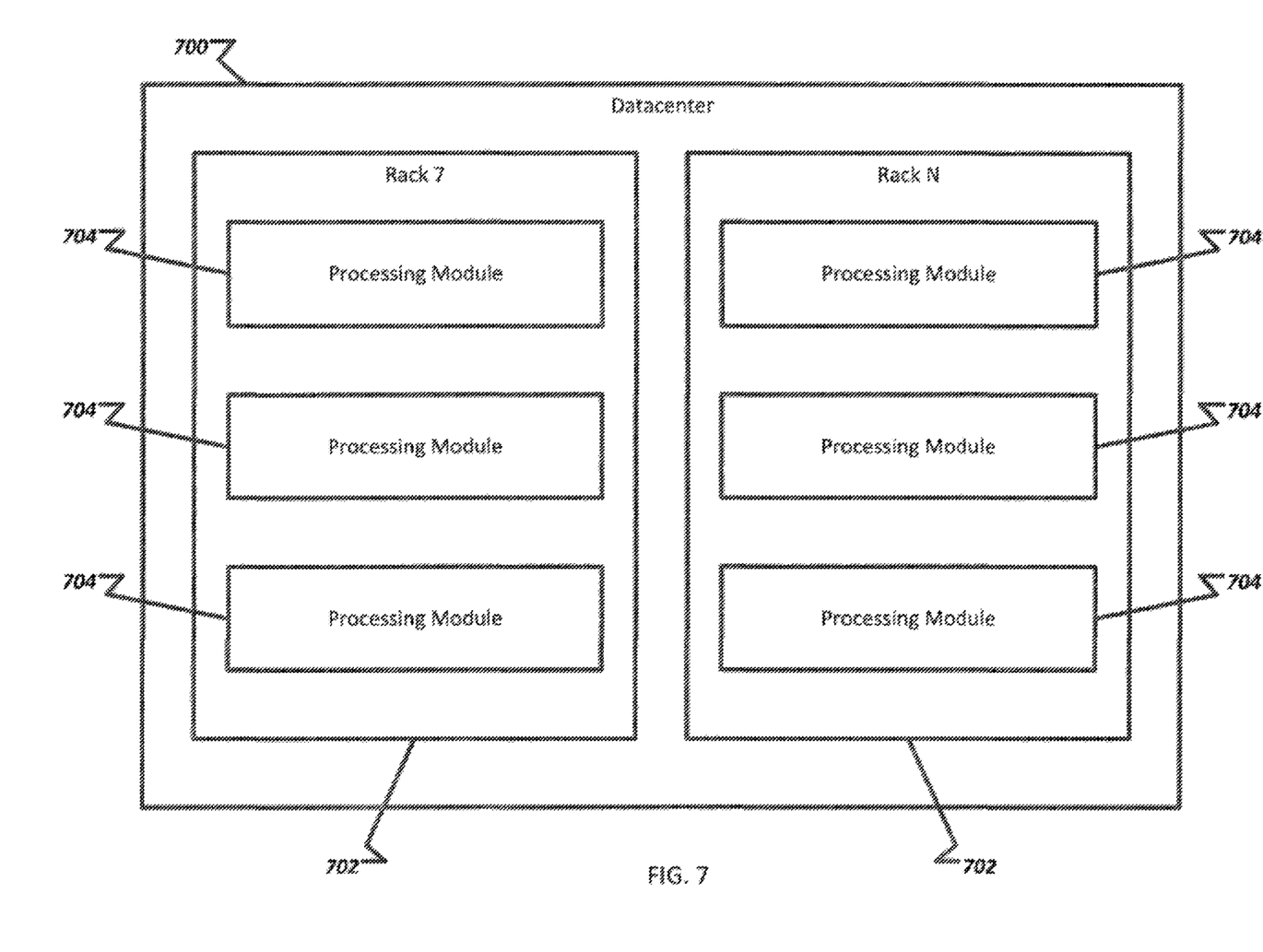
FIG. 7 is a block diagram illustrating example of a datacenter.

FIG. 7 is a block diagram illustrating an example of a datacenter (700). The datacenter (700) is used to store files, perform computational tasks, and transmit files to other systems outside of the datacenter using, for example, a network connected to the datacenter. In particular, the datacenter (700) may perform large-scale file processing to programmatically choose preferred storage parameters for stored files.

The datacenter (700) includes multiple racks (702). While only two racks are shown, the datacenter (700) may have many more racks. Each rack (702) can include a frame or cabinet in which components, such as processing modules (704), are mounted. In general, each processing module (704) can include a circuit board, such as a motherboard, on which a variety of computer-related components are mounted to perform file processing. The processing modules (704) within each rack (702) are interconnected to one another through, for example, a rack switch, and the racks (702) within each datacenter (700) are also interconnected through, for example, a datacenter switch.

In some implementations, the processing modules (704) may each take on a role as a master or slave. The master modules control scheduling and file distribution tasks among themselves and the slaves. A rack can include storage (e.g., one or more network attached disks) that is shared by the one or more processing modules (704) and/or each processing module (704) may include its own storage. Additionally, or alternatively, there may be remote storage connected to the racks through a network.

The datacenter (700) may include dedicated optical links or other dedicated communication channels, as well as supporting hardware, such as modems, bridges, routers, switches, wireless antennas, and towers. The datacenter (700) may include one or more wide area networks (WANs) as well as multiple local area networks (LANs).

Figure 8:
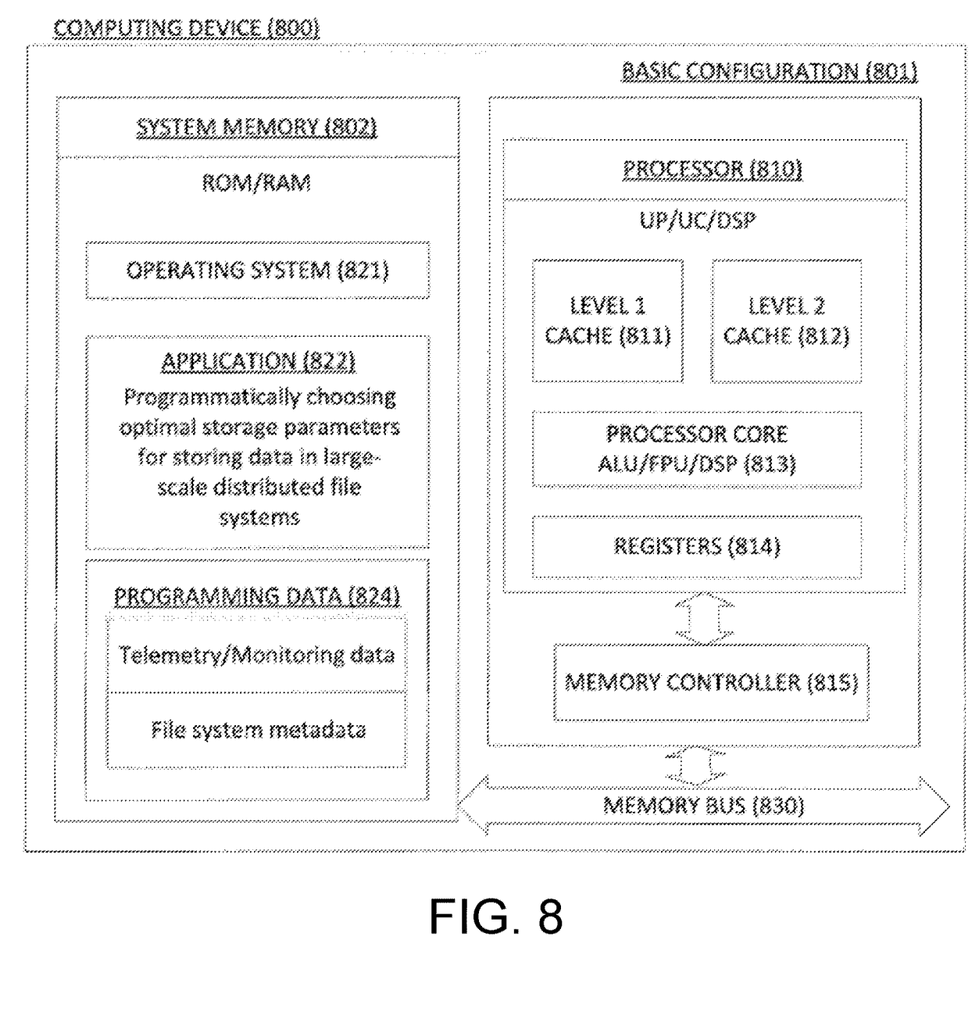
FIG. 8 is a block diagram illustrating an exemplary computing device.

FIG. 8 is a block diagram illustrating an example computing device (800) that may be used for one or more of the processing modules (704) of a datacenter. In a very basic configuration (801), the computing device (800) typically includes one or more processors (810) and system memory (802). A memory bus (830) can be used for communicating between the processor (810) and the system memory (820).

Depending on the desired configuration, the processor (810) can be of any type including, but not limited to a microprocessor (µP), a microcontroller (µθ), a digital signal processor (DSP), or any combination thereof. The processor (810) can include one or more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including, but not limited to, volatile memory (such as RAM), non-volatile memory (such as ROM, flash memory, etc.) or any combination thereof. System memory (820) typically includes an operating system (821), one or more applications (822), and program file (824). The application (822) programmatically chooses preferred storage parameters for storing files in large-scale distributed storage systems. Program file (824) may include data from telemetry or monitoring systems and storage system metadata. The operating system (821) generally includes procedures for handling various basic system services and for performing hardware dependent tasks. In some embodiments, the application (822) can be arranged to operate on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device (800). Any such computer storage media can be part of the device (800).

The telemetry/monitoring system data (802) and the storage system metadata (803) provide information, including access patterns and characteristics, regarding files stored in the large-scale storage system. The telemetry and/or monitoring file may be acquired from telemetry and/or monitoring systems.

The computing device (800) can be implemented as a portion of a small-form factor portable (or mobile) electronic device such as a cell phone, a smartphone, a personal file assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium, (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    determining, by a processor, based on access patterns of a first subset of files, a respective storage parameter threshold of a first file group of a plurality of file groups within a distributed storage system;
    identifying, by the processor, a second subset of files comprising a storage parameter stored at the first file group, the storage parameter of the second subset of files satisfying the respective storage parameter threshold of the first file group, the storage parameter comprising an age of the second subset of files, the second subset of files different from the first subset of files;
    after identifying the second subset of files, determining, by the processor, that the age of the second subset of files has reached a threshold age;
    based on determining that the age of the second subset of files has reached the threshold age, determining, by the processor, that the age of the second subset of files fails to satisfy the respective storage parameter threshold of the first file group; and
    in response to determining that the age of the second subset of files fails to satisfy the respective storage parameter threshold of the first file group, transferring, by the processor, the second subset of files from the first file group to a second file group within the distributed storage system, the storage parameter for the second subset of files satisfying a respective storage parameter of the second file group.

2. The method of claim 1, wherein an updated storage parameter comprises a re-encoding of the second subset of files.

3. The method of claim 1, further comprising generating an updated storage parameter based on a storage system characteristic of the distributed storage system, the storage system characteristic comprising at least one of:
    an availability of storage devices of the distributed storage system;
    a capacity of storage devices of the distributed storage system; or
    a performance of storage devices of the distributed storage system.

4. The method of claim 1, further comprising generating, by the processor, an alert for a user associated with the second subset of files transferred from the first file group to the second file group.

5. The method of claim 4, further comprising displaying, by the processor, the alert on a display in communication with the processor, the display configured to display file characteristics or storage system characteristics of the distributed storage system to the user.

6. The method of claim 4, further comprising communicating, by the processor, the alert to a display of a user interface.

7. The method of claim 6, wherein the user interface is configured to enable the user to view expenses associated with the second subset of files.

8. The method of claim 1, wherein transferring the second subset of files from the first file group to the second file group within the distributed storage system comprises determining that the second file group reduces a cost associated with storing the second subset of files in the distributed storage system.

9. The method of claim 1, wherein transferring the second subset of files from the first file group to the second file group within the distributed storage system comprises determining that the second file group reduces a number of replications of data associated with the second subset of files.

10. The method of claim 1, wherein the storage parameter comprises at least one of:
 a stripe width;
 a stripe size;
 a replication level; or
 a location for storing the second subset of files.

11. A distributed storage system comprising:
 a processor; and
 system memory in communication with the processor, the system memory configured to instruct the processor to perform operations, the operations comprising:
  determining, based on access patterns of a first subset of files, a respective storage parameter threshold of a first file group of a plurality of file groups within the distributed storage system
  identifying a second subset of files comprising a storage parameter stored at the first file group, the storage parameter of the second subset of files satisfying the respective storage parameter threshold of the first file group, the storage parameter comprising an initial age of the second subset of files, the second subset of files different from the first subset of files;
  after identifying the second subset of files, determining, by the processor, that the age of the second subset of files has reached a threshold age;
  based on determining that the age of the second subset of files has reached the threshold age, determining that the age of the second subset of files fails to satisfy the respective storage parameter threshold of the first file group; and
  in response to determining that the age of the second subset of files fails to satisfy the respective storage parameter threshold of the first file group, transferring the second subset of files from the first file group to a second file group within the distributed storage system, the storage parameter for the second subset of files satisfying a respective storage parameter of the second file group.

12. The distributed storage system of claim 11, wherein an updated storage parameter comprises a re-encoding of the second subset of files.

13. The distributed storage system of claim 11, wherein the operations further comprise generating an updated storage parameter based on a storage system characteristic of the distributed storage system, the storage system characteristic comprising at least one of:
 an availability of storage devices of the distributed storage system;
 a capacity of storage devices of the distributed storage system; or
 a performance of storage devices of the distributed storage system.

14. The distributed storage system of claim 11, wherein the operations further comprise generating an alert for a user associated with the second subset of files transferred from the first file group to the second file group.

15. The distributed storage system of claim 14, wherein the operations further comprise displaying the alert on a display in communication with the processor, the display configured to display file characteristics or storage system characteristics of the distributed storage system to the user.

16. The distributed storage system of claim 14, wherein the operations further comprise communicating the alert to a display of a user interface.

17. The distributed storage system of claim 16, wherein the user interface is configured to enable the user to view expenses associated with the second subset of files.

18. The distributed storage system of claim 11, wherein transferring the second subset of files from the first file group to the second file group within the distributed storage system comprises determining that the second file group reduces a cost associated with storing the second subset of files in the distributed storage system.

19. The distributed storage system of claim 11, wherein transferring the second subset of files from the first file group to the second file group within the distributed storage system comprises determining that the second file group reduces a number of replications of data associated with the second subset of files.

20. The distributed storage system of claim 11, wherein the storage parameter comprises at least one of:
 a stripe width;
 a stripe size;
 a replication level; or
 a location for storing the second subset of files.

* * * * *